(No Model.)
M. P. WARNER.
PLATE HOLDER FOR CAMERAS.
No. 372,778. Patented Nov. 8, 1887.
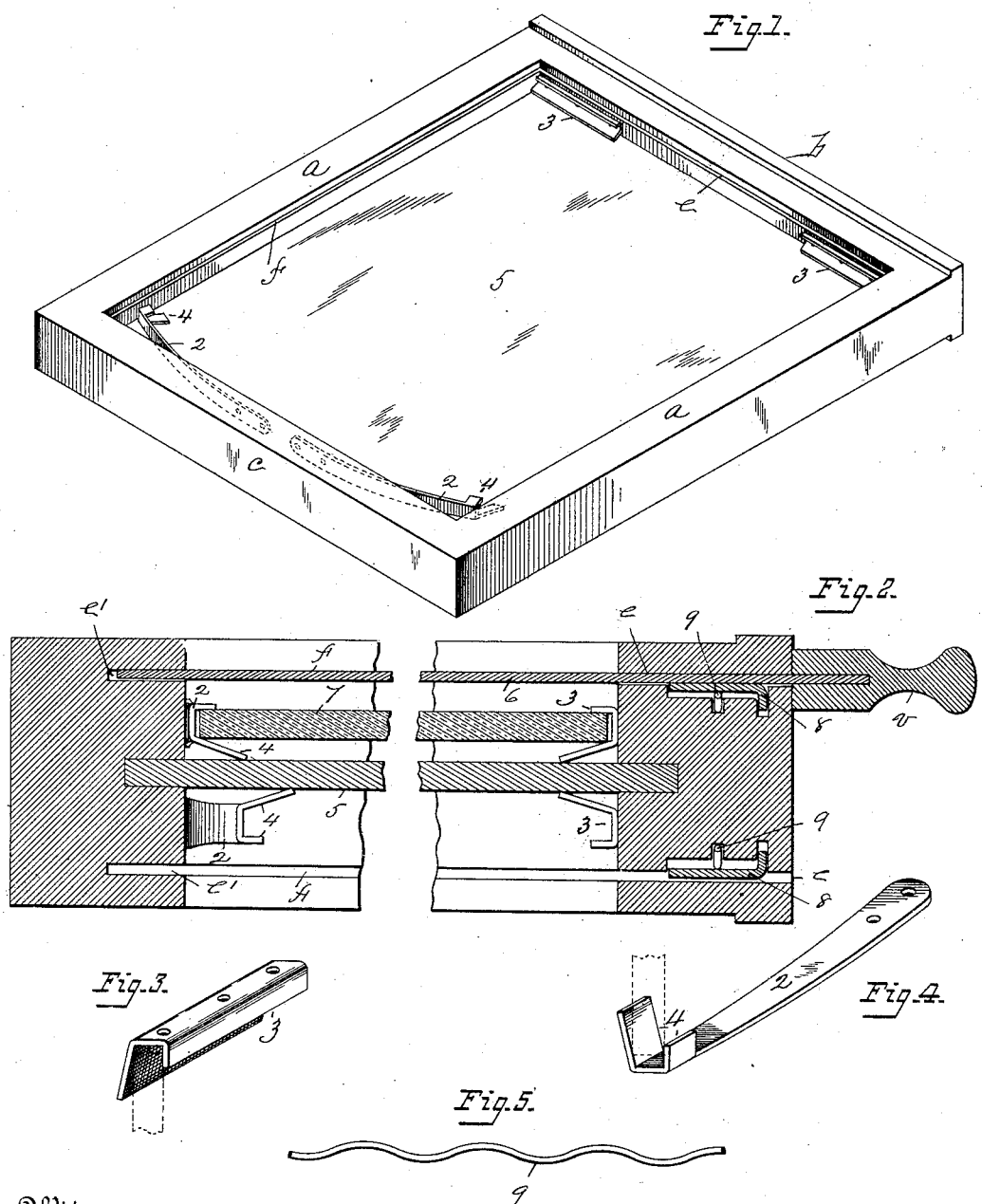
Witnesses
G. M. Chamberlain.
Court A. Cooper
Inventor
Milon P. Warner
By his Attorneys Chapin & Co.

UNITED STATES PATENT OFFICE.

MILAN P. WARNER, OF HOLYOKE, MASSACHUSETTS.

PLATE-HOLDER FOR CAMERAS.

SPECIFICATION forming part of Letters Patent No. 372,778, dated November 8, 1887.

Application filed April 4, 1887. Serial No. 233,541. (No model.)

*To all whom it may concern:*

Be it known that I, MILAN P. WARNER, a citizen of the United States, residing at Holyoke, in the county of Hampden and State of Massachusetts, have invented new and useful Improvements in Plate-Holders for Cameras, of which the following is a specification.

This invention relates to improvements in plate-holders for photographic cameras, the object being to provide in such plate-holder improved means for retaining a plate in proper position therein, said means providing improved facilities for inserting and removing a plate from the holder, and being adapted to hold said plate in proper focal position.

In the drawings forming part of this specification, Figure 1 is a perspective view of a plate-holder embodying my improvements, the slides thereof which cover the photographic plates being removed. Fig. 4 is a perspective view of one of the plate-holding springs. Fig. 3 is a perspective view of one of the plate-holding clips, the dotted lines shown in connection with said clip and spring indicating the position of the end of a plate relative to those parts when the plate is in the holder. Fig. 2 is a longitudinal sectional view of the plate-holder, showing one of the slides therein and one removed. Fig. 5 is a side view of a spring, hereinafter described.

In the drawings, *a b c* indicate, respectively, the side and end rails of the frame of the plate-holder, which is constructed of wood or other similar material, of rectangular form and of such dimensions as may be required for the photographic plates which it is to hold. Said frame is provided with a thin metallic or other diaphragm, 5, secured therein in suitable grooves in the frame, as shown in Fig. 2, and located about centrally between the opposite sides of the frame and constituting a close partition, separating one side of the plate-holder from the other, thereby forming in each side of the latter a proper recess or chamber to receive a prepared photographic plate, which, after having been exposed in a camera in the usual manner, becomes what is termed a "negative." The said frame of the plate-holder has two slots, *e*, through the upper or head end thereof, corresponding in position with the ends of two longitudinal grooves, *f*, in the inner opposite sides, *a*, and on the opposite sides of the diaphragm 5, said slots and grooves being provided for the reception of two slide-plates, 6, (one of which is shown in the plate-holder in Fig. 2,) made preferably of thin sheet metal, each having a suitable head or handle, *v*, on one end thereof, as shown, said plates 6 each forming, when pushed into said frame, one side of a close dark chamber for the reception of said negative plate, one end of said slide-plate entering a groove, *e'*, in the inner side of the lower end, *c*, of the frame, as shown in Fig. 2. By means of the said grooves *e*, *e'*, and *f* in the frame, which entirely inclose the borders of the slide-plate 6 when the latter is in position in the frame to cover and protect the negative plate 7, the entrance of any light into the said dark plate-chamber in the holder is wholly prevented.

The aforesaid slots *e* in one end of the frame of the plate-holder are provided with automatically-operating devices for cutting off any light that otherwise might enter the aforesaid plate-chamber when either one of the slides 6 is withdrawn from the holder, and for preventing any light from passing between one side of said slide and the adjoining side of the groove in which it moves, and said light-obstructing devices are constructed and operate as follows:

Referring to Fig. 2, in which the upper end, *b*, of the plate-holder is shown in section, it will be seen that at the side of the groove *e* is formed a recess, in which is placed a metallic strip, 8, which extends longitudinally in said end *b* at one side of said slot. One edge of said metallic strip 8 is bent over, as shown, and enters a groove at one edge of said recess, and about midway between the edges of the strip 8 is secured a strip, which also enters a groove parallel with the first-mentioned one, and between the last-named strip and the bottom of the groove which receives it is placed a metallic spring, 9, consisting simply of a piece of spring-wire of sinuous form, as shown in Fig. 5, which constitutes a spring which operates to carry the said metallic strip 8 against the side of the slide 6, as shown in Fig. 2, and when said slide is withdrawn from the holder to carry said strip cross the slot e, whereby light is prevented from passing through the slot e into the plate-chamber. One edge of the metallic strip 8 (that edge being the one nearest the outer end of the frame) is turned over as aforesaid, in order to give it such a form as will prevent said strip from obstructing the free entrance of the end of the slide 6 into and through the slot e in the frame.

For the purpose of securing and holding the aforesaid glass negative plates 7 in the plate-holder, two plate-holding springs, 2, are secured on the inner side of the lower end, c, of the holder, which springs are made separately, as shown, or consist of one strip of spring metal—as brass or steel—having the ends thereof properly formed, as shown, whereby their normal position is that shown in Fig. 1, the free ends thereof standing away from the part of the frame to which they are attached. The said plate-holder springs have each secured thereon, or made as an integral part thereof, two lips, 4, either one or both of said lips being more or less inclined to the side of the spring, in order to provide a receptacle for the lower edge of the negative plate 7, which will prevent the latter from moving therein toward or from the diaphragm 5, so as to keep said plate in proper focal position in the holder. The position of the lower end of the parallelogram drawn in dotted lines in Fig. 4 illustrates that of the part of a plate which is in engagement with the lips of the spring 2 when the plate is held by the latter. In practice the inclined lip of each spring 2 is set close to or bearing slightly against the adjoining side of the diaphragm 5, in order to facilitate the engagement of the lower end of the negative plate therewith when working in a dark closet.

The means for holding the upper end of the negative plate in the holder consist of two metallic clips, 3, made of the form shown in Figs. 1 and 3, which clips are secured on the inner side of the end b of the plate-holder frame, preferably near the opposite corners of the latter, as shown. By reference to Fig. 3 it will be seen that one of the borders of said clip is bent substantially at right angles to its base, and that its opposite border stands at an incline to said base, this form being given to the clip for the same purpose as that described relative to the lips 4 on the spring 2. The clips 3 are secured in the holder between the slot e and the diaphragm 5, with their inclined borders against said diaphragm, whereby their narrower borders are brought uppermost. If desired, the upper end of the plate 7 may be secured by one only of said clips 3, placed about midway between the borders of the holder; but the plate would be less steadily supported thereby. From the above description of the plate-holder herein referred to, and from its construction as illustrated in the drawings, it should be understood that the plate-holding devices on each side of the diaphragm 5, when the plate-holder is made in double form, as shown, are identical in their construction, and hence a description of those pertaining to one side of the holder applies to those on the other side thereof.

In putting a negative plate into the holder, the lower end thereof is placed between the lips of the springs 2 at the lower end of the holder, and the plate is pressed downward against said springs until the upper end thereof is brought below the projecting edge of the clips 3, when the upper end of the plate is carried toward the diaphragm 5 and between the two lips of said clips, when the plate is released, permitting said springs to carry the upper end of the plate 7 into engagement with the clips, as shown in Fig. 2, and said plate is then held immovably in the holder by the force of the springs 2 and the said lips and borders, respectively, on the springs and clips. Fig. 2 illustrates said negative plate 7 in position in the plate holder, and the opposite side of the latter with no plate therein, and showing the end of one of the springs 2 in its upward normal position.

To remove the negative plate from the holder, said plate is forced downward against the ends of the springs 2 sufficiently to permit the upper end of the plate to be drawn outward away from the clips 3.

The within-described construction of plate-holding devices attached to the frame of the plate-holder, as set forth—that is to say, the springs 2 and the clips 3—obviates the necessity of any springs between the negative plate 7 and the diaphragm 5, such as have been heretofore employed to cause the negative plate to remain in a proper focal position when in the plate-holder.

What I claim as my invention is—

A photographic negative-plate holder consisting of a frame, substantially as described, having a plate-chamber on one or both sides thereof, a slide-plate to be moved through a slot in one end of said frame and within grooves in the inner borders of the latter to close one side of said chamber, and plate-engaging springs, as 2, secured at one end of said plate-chamber, having lips thereon, between which one end of said negative plate engages, and one or more clips, as 3, secured at the opposite end of said chamber, with which the opposite end of said plate engages, substantially as set forth.

MILAN P. WARNER.

Witnesses:
G. M. CHAMBERLAIN,
H. A. CHAPIN.